United States Patent
Fischer et al.

(10) Patent No.: US 7,436,286 B2
(45) Date of Patent: Oct. 14, 2008

(54) CIRCUIT ARRANGEMENT AND METHOD FOR INCREASING THE FUNCTIONAL RANGE OF A TRANSPONDER

(75) Inventors: Martin Fischer, Pfedelbach (DE); Volkhard Flassnoecker, Heilbronn (DE); Ulrich Friedrich, Ellhofen (DE); Dirk Ziebertz, Eberstadt (DE)

(73) Assignee: ATMEL Germany GmbH, Heilbronn (DE)

( * ) Notice: Subject to any disclaimer, the term of this patent is extended or adjusted under 35 U.S.C. 154(b) by 326 days.

(21) Appl. No.: 11/002,852

(22) Filed: Nov. 30, 2004

(65) Prior Publication Data

US 2005/0122651 A1 Jun. 9, 2005

(30) Foreign Application Priority Data

Dec. 3, 2003 (DE) ................................. 103 56 259

(51) Int. Cl.
*H04Q 5/22* (2006.01)
(52) U.S. Cl. .................. 340/10.1; 340/10.4; 340/572.5; 340/10.51; 340/10.34; 340/572.4; 340/572.1; 340/10.5; 340/825.69; 340/825.72
(58) Field of Classification Search ................ 340/10.1, 340/10.4, 572.5, 10.51, 10.34, 572.4, 572.1, 340/10.5, 825.69, 825.72
See application file for complete search history.

(56) References Cited

U.S. PATENT DOCUMENTS

| | | | |
|---|---|---|---|
| 4,037,271 A * | 7/1977 | Keller ...................... 363/21.07 |
| 4,040,053 A | 8/1977 | Olsson |
| 4,274,083 A * | 6/1981 | Tomoeda ................ 340/825.72 |
| 4,641,132 A * | 2/1987 | Reger .......................... 340/540 |
| 5,448,242 A * | 9/1995 | Sharpe et al. .................. 342/42 |
| 5,479,172 A * | 12/1995 | Smith et al. ..................... 342/51 |
| 5,870,031 A * | 2/1999 | Kaiser et al. ............. 340/10.34 |
| 6,011,488 A | 1/2000 | Buesser |
| 6,489,883 B1 * | 12/2002 | Iiyama et al. ................ 340/5.1 |
| 6,982,627 B2 * | 1/2006 | Oberhuber et al. ......... 340/10.1 |
| 2003/0102961 A1 | 6/2003 | Fischer et al. |

FOREIGN PATENT DOCUMENTS

| | | |
|---|---|---|
| DE | 35 55 202 | 8/1996 |
| DE | 696 03 029 | 1/2000 |
| EP | 0 389 515 | 4/1996 |

* cited by examiner

*Primary Examiner*—Brian Zimmerman
*Assistant Examiner*—Vernal Brown
(74) *Attorney, Agent, or Firm*—W. F. Fasse; W. G. Fasse

(57) ABSTRACT

A transponder receives its operating energy from an external source such as a radio signal or a battery. Such transponders are used for example in a vehicle or in a remote sensor. The response range of the transponder is increased by converting the received energy into an operating voltage which in turn is used to generate a function voltage required for performing a current function sequence. The generated function voltage is checked to determine at least one characteristic of the generated function voltage. The determined function voltage characteristic, for example a voltage value directly representing the function voltage, is then used to acknowledge or reject a result of performing the function sequence. Thus, the time duration for performing any current function sequence is flexibly adapted to the current requirements of that function sequence, whereby the power consumption of the transponder is optimally reduced and the response range respectively increased.

22 Claims, 5 Drawing Sheets

CIRCUIT ARRANGEMENT AND METHOD FOR INCREASING THE FUNCTIONAL RANGE OF A TRANSPONDER

PRIORITY CLAIM

This application is based on and claims the priority under 35 U.S.C. §119 of German Patent Application 103 56 259.1, filed on Dec. 3, 2003, the entire disclosure of which is incorporated herein by reference.

FIELD OF THE INVENTION

The invention relates to a circuit arrangement for increasing the functional range of any transmission device that derives its operating power from a source such as a battery or the energy of an electromagnetic field through which a signal is transmitted to the device such as a transponder or a remote sensor.

BACKGROUND INFORMATION

The present circuit arrangement and method are particularly adapted for use in a transponder or in a remote sensor that has a transponder for responding to an interrogation transmitted through an electromagnetic field. In this context the term "transponder" is intended to encompass any apparatus that receives its operating energy from an electromagnetic field. For this purpose the apparatus has a voltage converter for generating a function voltage from an operating voltage for performing a function sequence. The term "function sequence" is intended to include a single function.

In connection with radio frequency identification methods ever larger response ranges are required of the respective identification devices. This applies particularly to methods and devices in the RFID-field (Radio Frequency Identification Devices) using so-called passive transponders which regularly must sustain their standby operation with a small electrical power while deriving their operational power from a base station which transmits the operation electrical power to the passive transponder through an electromagnetic field.

In this context the term "response range" or "function range" is intended to mean a distance between the base station and the transponder over which distance the transponder can return a useful signal to the base station in response to an interrogation from the base station. In order to transmit such a useful signal the transponder must be capable of deriving from the electromagnetic field a function voltage that is distinctly higher than its normal operating or standby voltage. Additionally, the higher function voltage must be available for a time duration sufficient for performing a respective function sequence. Further, this function voltage must be available with certainty, at least for the required time duration.

Such a function sequence may, for example, be a programming operation, more specifically, writing into a suitable memory or reading from a suitable memory such as an EEPROM (Electronically Erasable Programmable Read Only Memory). In the case of a remote sensor which encounters the same problems, the function may, for example, be a measuring operation. For example, programming voltages in conventional EEPROMS are within the range of 12 to 14V compared to a standby voltage, also referred to as operating voltage, in the range of 1 to 3V. In this context the higher function voltages must be available for a time duration of a few milliseconds in order to successfully and completely perform a function sequence.

In connection with conventional passive transponders the programming voltage, also referred to as function voltage is generated with a multistage voltage converter or a so-called multistage charge pump. Charge pumps as such are well known. The generation of the higher voltage or rather the result of the generation is referred to as "run-up" voltage. Conventionally, a predetermined waiting period follows the voltage run-up. The waiting period is based on the assumption that a sufficient function voltage has been present during the waiting period for properly concluding the intended function sequence. Conventional devices of this type do not permit any checking of the function sequence itself or the result of the function sequence. It is a particular disadvantage of conventional devices that a function duration, for example a programming duration, is fixed independently of the actual time needed for such programming.

It is further known in connection with devices of this type that the operating voltage is measured at the time when a function cycle is taking place. This measuring of the operating voltage is done in order to take into account load variations, for example due to a delayed or prolonged voltage run-up, due to an increased switch-on current and/or due to parasitic currents in the saturation phase. The measured operating voltage values are then compared with a reference value, whereby positive comparing results are counted and whereby, following a passing of a predetermined time, a further comparing is performed with a further reference value. If a function duration is shorter than the further reference value, the conclusion is reached that the respective function sequence was not successful. These conventional approaches for solving the problem of achieving an increased response range have particularly the disadvantage that the measuring of the operating voltage merely is an indirect measurement of the function voltage, whereby only a breakdown of the operating voltage provides a certain reference point regarding the function voltage. Another disadvantage of conventional devices is seen in that the control is a pure open loop control in which the function time duration is again determined independently of the actual run-up time. Thus, the function time duration is not adaptable to concrete actual requirements such as an increased programming range or rather response range.

Particularly with regard to the last mentioned requirement of an increased programming or response range it is seen as a disadvantage in known devices that in connection with high impedance energy sources the operating voltage can break down in response to an increased switch-on voltage. Such voltage break down can happen, for example, if the impedance of a voltage converter for producing a direct voltage out of the alternating voltage energy taken from the electromagnetic field, is too large. Such a situation leads to a so-called "power-on-reset" (POR), whereby the response range is further reduced. Conventional voltage multipliers have the same effect. Such voltage multipliers comprise a multitude of transistor switches which lead to losses due to respective voltage drops across these switches.

OBJECTS OF THE INVENTION

In view of the foregoing it is the aim of the invention to achieve the following objects singly or in combination:
  to improve a method and circuit arrangement as described above to achieve a larger transmission range or rather response range;
  to assure a more certain function and to make the method and circuit arrangement more flexible with regard to the fields of use, particularly with regard to an increase of the function or response range;

to depart from the conventional open loop control and to use a closed loop control by monitoring the function voltage which must be sufficient for performing a function sequence and to use a respective function voltage derived value or signal that directly represents the function voltage for the closed loop control;

to adapt the time for performing a particular function sequence to the requirements of that particular function sequence, so that less time will be allocated to a short function sequence than to a longer function sequence; and to limit the input current of the present circuit arrangement in closed loop fashion to avoid the above mentioned POR problems.

The invention further aims to avoid or overcome the disadvantages of the prior art, and to achieve additional advantages, as apparent from the present specification. The attainment of these objects is, however

SUMMARY OF THE INVENTION

According to the invention the above objects have been achieved by a circuit arrangement for increasing a transmission or response range of a device such as a passive transponder or remote sensor, which receives its operating energy from a source such as a radio frequency signal transmitted as an electromagnetic field or from a battery, said circuit arrangement comprising an input for receiving the operating energy to provide an operating voltage, a voltage converter (3) connected to the input receiving the operating voltage and for generating a function voltage from the operating voltage. The function voltage enables the circuit arrangement to perform a function or function sequence. A voltage processing circuit (4) is connected to an output of the voltage converter (3). The voltage processing circuit (4) has two circuit sections. A determining section (4.7) determines at least one characteristic of the function voltage. A valuation circuit section (4.8) evaluates a function sequence or the result of a performance of a function sequence in response to the at least one characteristic of the function voltage, whereby a function or function sequence is either accepted and/or rejected or terminated in response to a closed loop control based on the at least one characteristic of the function voltage. This at least one characteristic is, for example a voltage value of the function voltage.

According to the invention there is further provided a method for increasing a transmission or response range and thus the reliability of a device which receives its operating energy from a source, e.g. an electromagnetic field or a battery, said method comprising the following steps:

a) generating a function voltage out of operating energy for enabling the device to perform a function sequence;

b) determining at least one characteristic value of the function voltage to provide a voltage characteristic value or signal; and c) evaluating said voltage characteristic value or signal for performing any one of a confirming step or a rejection step regarding said function sequence in response to said voltage characteristic value or signal which provides information whether the performance of a function sequence is acceptable or not acceptable.

By determining at least one characteristic value of the function voltage, it becomes possible to reject or accept the result of performing a function sequence by a closed loop control that depends on the at least one determined characteristic of the function voltage. More specifically, according to the invention it is not necessary to wait for a predetermined time before a performance decision can be made. For this purpose the present determination circuit for determining at least one function voltage characteristic such as the voltage level cooperates with the valuation circuit for acknowledging and/or rejecting the result of a function sequence, whereby the output signal of the determination circuit controls the valuation circuit in closed loop fashion depending on the determined characteristic of the function voltage.

Thus, the invention replaces the conventional open loop control that is prone to errors and not flexible in its adaptability to different time durations by a closed loop control concept. By directly monitoring the function voltage that determines the performance of a function sequence or more specifically the result of a function sequence performance the closed loop control is based on such direct monitoring. A signal produced by the monitoring is used to acknowledge or reject the result of a function sequence in response of the determined characteristic of the function voltage. Particularly, the duration of performing a function sequence is now controlled in closed loop fashion. Thus, the invention makes it possible to achieve larger response ranges and to avoid the power supply difficulties that conventionally accompany increased response ranges of such devices as transponders and transponder equipped remote sensors. More specifically, the invention enables to flexibly and individually adapt, match or adjust the duration needed for performing a function sequence to the needs of that particular function sequence. Hence, the performance duration may be increased when necessary or it may be reduced where a function sequence is quickly performed. A reduction of the performance duration has the further advantage that the transponder is more quickly available again for a new interrogation, such as a write-in and/or a read-out operation particularly in connection with an electrically erasable memory such as an EEPROM.

It is also advantageous that the circuit arrangement according to the invention, more specifically the valuation circuit, comprises a simple comparator for comparing the function voltage or rather a value directly representing the function voltage, with a reference value. For practical reasons this function voltage representing value is preferably a voltage level value. Comparing this value with a reference value is a simple matter that is economically implemented.

The generation of the function voltage representing value is easily accomplished by a reliable voltage divider which, most preferably, is a capacitive voltage divider so that a direct current through the voltage divider is obviated thereby reducing or eliminating a dissipation power.

The valuation circuit of the invention preferably comprises a threshold value switch functioning as a comparator, whereby a simple possibility of comparing the function voltage with the reference voltage is available. The valuation circuit comprises preferably a first counter for evaluating an output signal of the determination circuit. The counter is constructed for ascertaining a first number of time intervals during which the function voltage has a characteristic that is necessary for a proper performance of a function sequence. Thus, the first counter determines a time duration during which the function voltage has a characteristic necessary for performing a function sequence.

In a preferred embodiment the valuating circuit comprises a second counter for determining a second number of time intervals that have passed since the generation of the function voltage. More specifically, the second counter indicates a time that has passed since the function voltage generation.

It is another advantage of the invention that the second count makes it possible to provide a signal for terminating and/or rejecting the result of a function sequence performance when the respective performance took up more time than a predetermined number of time intervals counted by the second counter. More specifically, the function sequence is interrupted and/or rejected when the time duration determined by the second counter exceeds a predetermined time duration. As a result, unduly long function sequence durations, for example when the transponder is moved outside the permissible range, are avoided.

By providing the first counter in the valuating circuit the invention achieves the advantage that the result of a performed function sequence can be acknowledged in response to the first counter reaching a predetermined number of time intervals. More specifically, the result of a function sequence is acknowledged when the count in the first counter reaches a predetermined end value. Thus, the duration of the performance of a function sequence can be limited to the actually required duration, whereby the predetermined number of time intervals counted by the first counter is smaller than the predetermined number of time intervals counted by the second counter.

In order to avoid the above mentioned POR problems, the circuit arrangement of the invention is preferably and advantageously equipped with a current limiter for limiting the switch-on current. This current limiter is preferably a MOS-FET transistor or at least an RC filter component having a switchable capability to change the filter characteristic. The current limiter is connected in the circuit between the circuit input and the voltage converter. The advantage of the switch-on current limiter is seen in that the run-up characteristic of the function voltage can be adapted specifically to the individual requirements of any function sequence. Limiting the input current to the voltage converter has the advantage that the input current can be adapted in timely fashion with a closed loop control.

Rather than using transistors in the voltage converter according to the invention it is preferred and advantageous to use Schottky diodes instead in order to limit the dissipation power of the present circuit arrangement.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
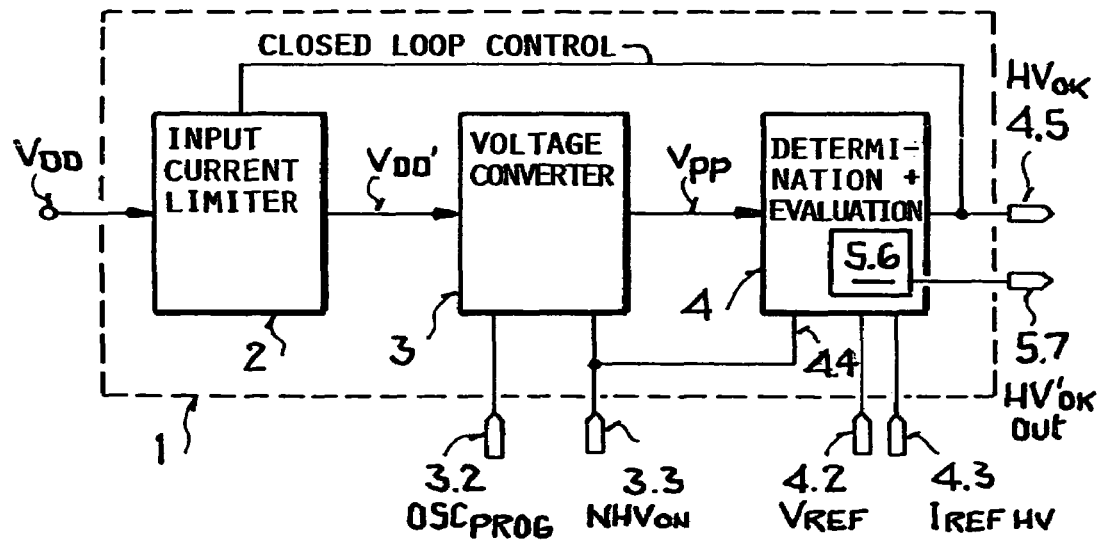
FIG. 1 is a block diagram of a circuit arrangement according to the invention including an input current limiter, a voltage converter, and a voltage processing circuit including a determination circuit section and a valuation circuit section.

The block circuit diagram of FIG. 1 shows an overall view of the circuit arrangement 1 according to the invention. This circuit arrangement is preferably a monolithic integrated circuit for use for example in a radio frequency transponder or in a remote sensor equipped with a transponder.

The circuit arrangement 1, referred to simply as circuit 1, comprises a current limiter 2 forming the input of the circuit 1 to which an operating voltage $V_{DD}$ is supplied. In the present example of a transponder or remote sensor the operating or standby voltage $V_{DD}$, is extracted from an electromagnetic field by means of a receiver component such as an antenna not shown. The electromagnetic field is transmitted by a base station. The extracted input operating voltage is rectified by a suitable rectifier such as a diode rectifier bridge not shown. Rectification is followed by a signal conditioning as is conventional.

Figure 2:
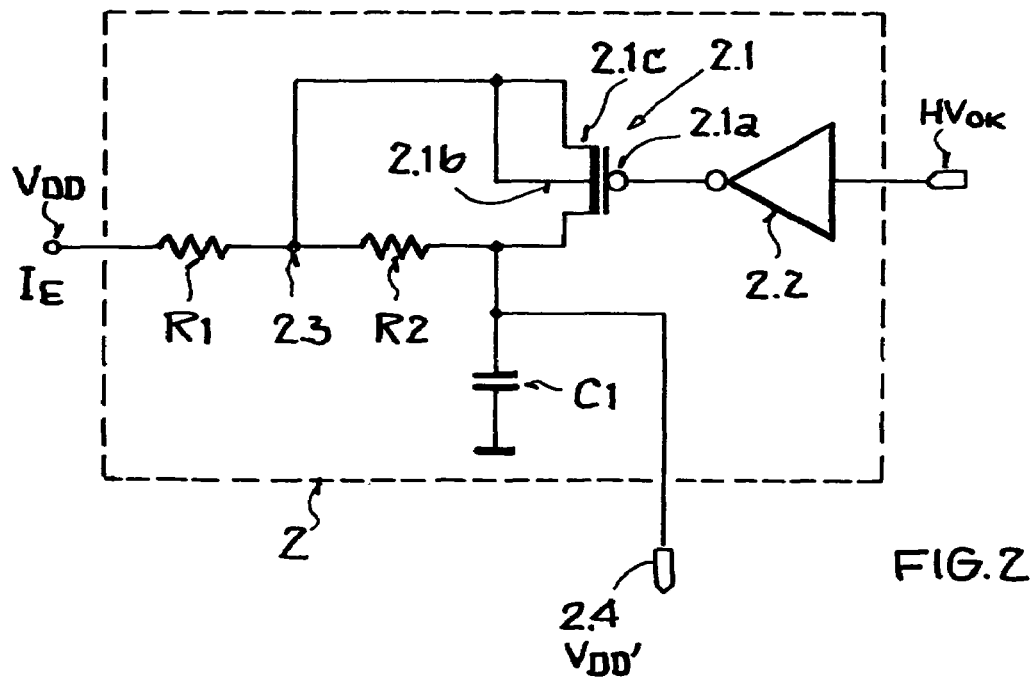
FIG. 2 illustrates a detailed circuit arrangement of the present input current limiter.

Referring to FIG. 2, the current limiter 2 provides at its output 2.4 an operating voltage $V_{DD}'$. The output 2.4 of the current limiter 2 is connected to a voltage converter 3. The function of the voltage converter 3 will be described in more detail below with reference to FIGS. 3A to 3D. As shown in FIG. 4, the voltage converter 3 comprises two signal inputs 3.2 and 3.3 for control signals OSC-PROG and NHVON, respectively. The voltage converter 3 generates a function voltage $V_{PP}$ and supplies this voltage at its output 3.6. This function voltage $V_{PP}$ is noticeably higher than the operating voltage $V_{DD}$. For example, the function voltage $V_{PP}$ is within the range of 12 to 14 V, while the operating voltage $V_{DD}$ is, for example 1.6 V. The function voltage $V_{PP}$ is used preferably as a programming voltage, for example for writing or erasing an EEPROM (electronically erasable programmable read only memory) not shown.

The output 3.6 of the voltage converter 3 is connected to the circuit 4 that combines a determination circuit section 4.7 and a valuation circuit section 4.8 to be described in more detail below with reference to FIGS. 4 and 5. The circuit 4 has a first input 4.1 for inputting the function voltage $V_{PP}$. A further input 4.2 of the circuit 4 receives a first voltage reference signal $V_{REF}$. A further input 4.3 receives a second reference current signal IREF_HV. An input 4.4 receives the control signal NHV_ON. The circuit 4 has an output 4.5 providing a logic control signal HV_OK which represents the evaluation of the function voltage $V_{PP}$. When this logic control signal HV_OK has a high level HV_OK=1 it indicates the presence of a function voltage $V_{PP}$ suitable for performing an intended function sequence. This function voltage $V_{PP}$ is particularly suitable for programming an EEPROM.

FIG. 2 shows a detailed circuit diagram of the current limiter 2 for limiting the input current IE that is associated with the operating or input voltage $V_{DD}$. The limiter 2 comprises an RC-component including a number of series connected resistors R1 and R2 and a capacitor C1. The RC-component functions as a filter for the input current IE, please see also FIGS. 3A and 3B. A PMOS-transistor 2.1 is connected in parallel to the resistor R2 thereby bridging the resistor R2 when the transistor 2.1 is conducting. The gate 2.1*a* of the transistor 2.1 is connected through an inverter 2.2 to an input terminal which receives the evaluation or logic control signal HV_OK. The bulk terminal 2.1*b* of the PMOS-transistor 2.1 is connected to the circuit node 2.3 between the series connected resistors R1 and R2. The source terminal 2.1*c* of the transistor 2.1 is also connected to the circuit node 2.3. The operating voltage $V_{DD}$ as filtered by the RC-component R1, R2 and C1 is supplied as an output voltage $V_{DD}'$ at an output 2.4 which is connected to a respective input of the voltage converter 3 shown in FIG. 4.

The current limiter 2 of FIG. 2 receives at the input of its inverter 2.2 the logic control signal HV_OK. When the control signal HV_OK is at its high level (HV_OK=1) the second resistor R2 is bridged by the transistor 2.1 so that a changed, particularly a reduced filter effect of the RC-component results. A reduced filter effect permits accelerating the run-up of the voltage in the following voltage converter 3 as shown in FIG. 4.

Limiting the input current IE with the help of the current limiter 2 prevents a break down of the operating voltage, thereby also eliminating the problems of a so-called power-on-reset (POR). The current limiter 2 can alternatively be realized by components not expressly shown in FIG. 2. Such components may comprise a simpler RC-component without a PMOS-transistor 2.1. For example, such a simpler RC-component may have a constant filter characteristic. Alternatively, a self-conducting PMOS-transistor may be used alone. In that case the gate of the transistor is connected to the substrate potential, such as ground.

Figure 3A:
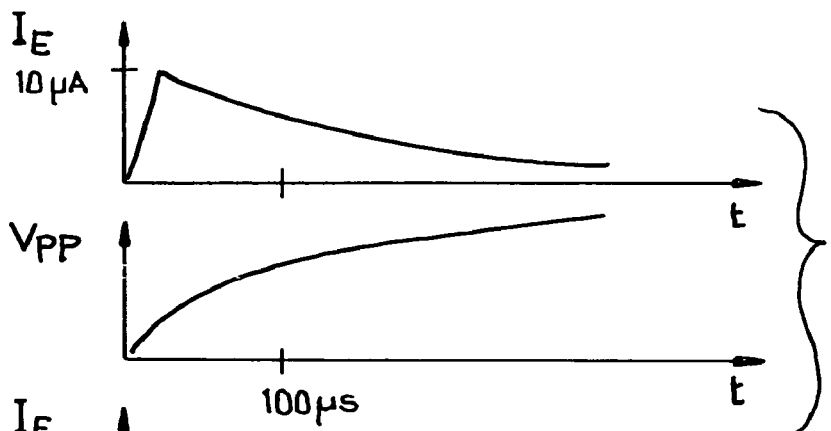
FIGS. 3*a* to 3*d* illustrate current flow and respective voltage run-up characteristics as functions of time in a circuit arrangement according to the invention.

FIGS. 3A to 3D show graphically the effect of the current limiter 2. The lower portion of FIG. 3A illustrates the run-up of the function voltage $V_{PP}$ as a function of time. The upper portion of FIG. 3A shows the input current IE as a function of time when no current limiter is used. Without the use of a current limiter the current has a peak value, for example, in the range of 10 μA, and remains relatively high for a relatively long period of time, for example 100 μs, whereby undesirable voltage break downs of the operating voltage $V_{DD}$ may occur which in turn cause delays or the desired function sequence does not take place, or rather the function sequence is not performed.

Figure 3B:
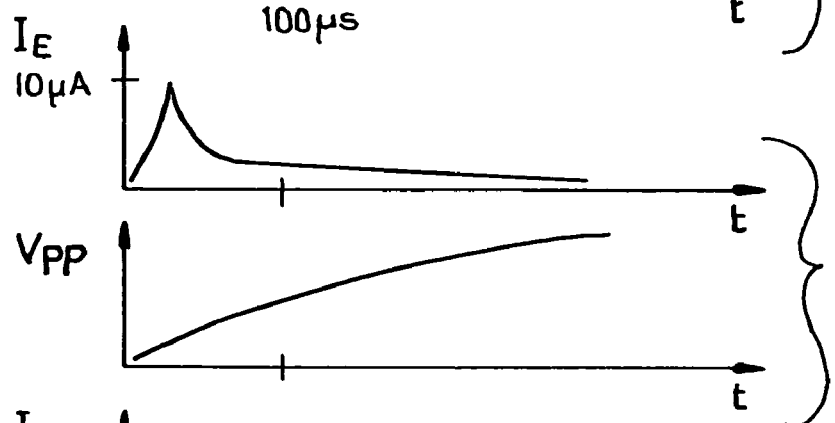
Figure 4:
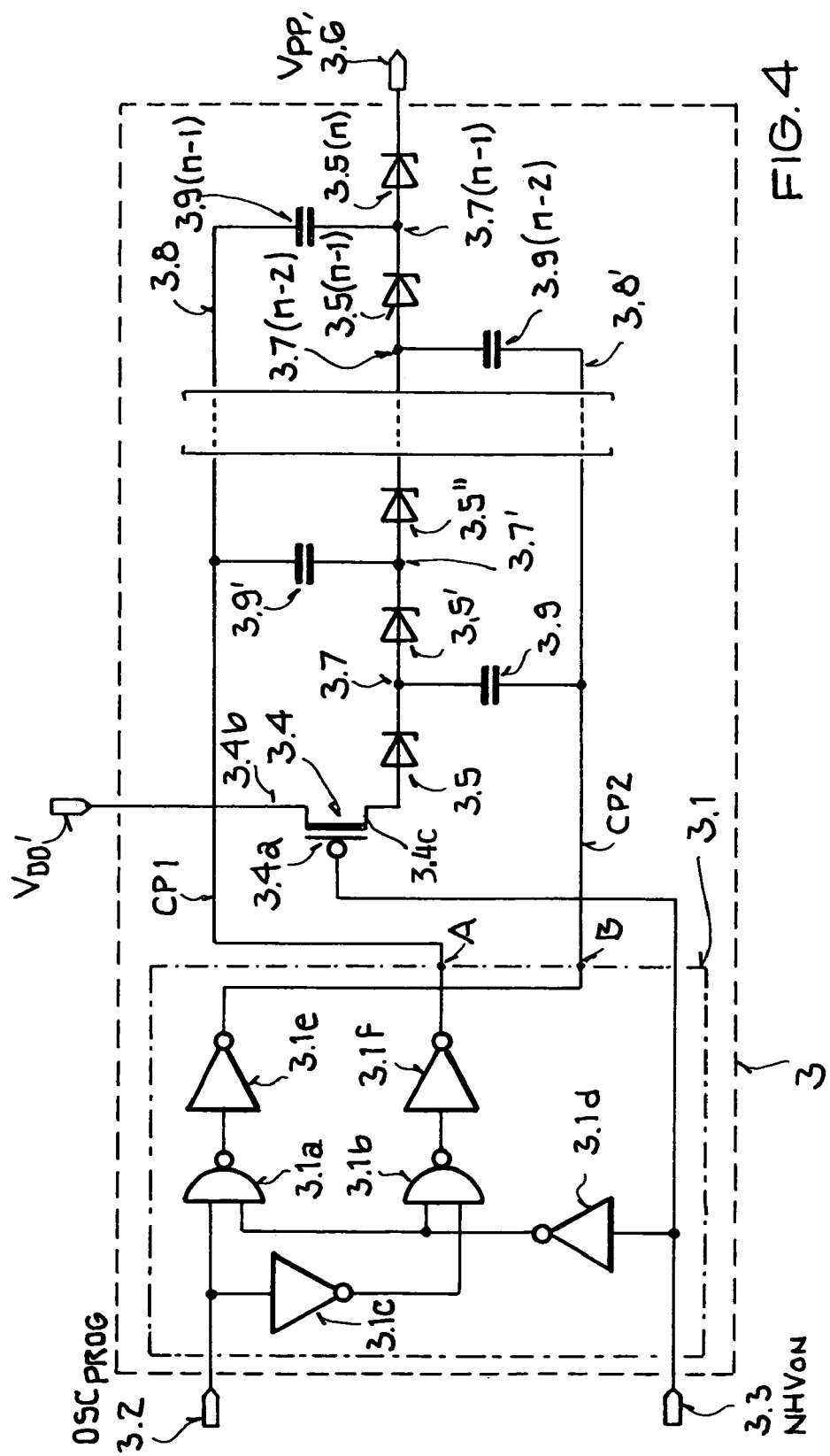
FIG. 4 is a detailed circuit diagram of the present voltage converter in a circuit arrangement of the invention shown in FIG. 1.

FIG. 3B shows the characteristic of the input current IE and the function voltage $V_{PP}$ when the current limiter 2 is a simple PMOS-transistor. The current shows a single high current peak which, however, is not critical due to its short duration, whereby the current does not cause any voltage breakdown. However, compared to FIG. 3A the run-up of the function voltage $V_{PP}$ is significantly slowed down in FIG. 3B.

Figure 3C:
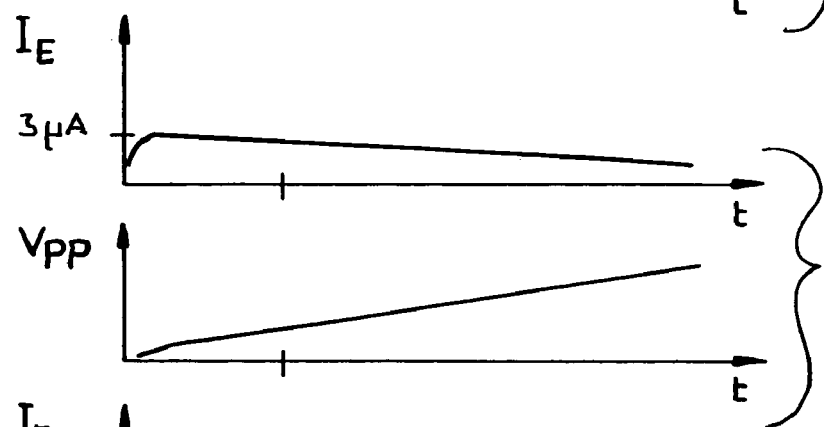

FIG. 3C shows the use of a simple RC-component having a constant filter characteristic for limiting the current. More specifically, the simple RC-component has a constant ohmic resistor and a constant capacity capacitor, whereby an input current is obtained that is substantially constant over time. Please see the upper portion of FIG. 3C. However, the function voltage $V_{PP}$ rises still slower than in FIGS. 3A and 3B. Therefore, it is preferred that the RC-component is switchable by a closed loop control. Please compare FIG. 3D representing the limiter embodiment shown in FIG. 2.

Figure 3D:
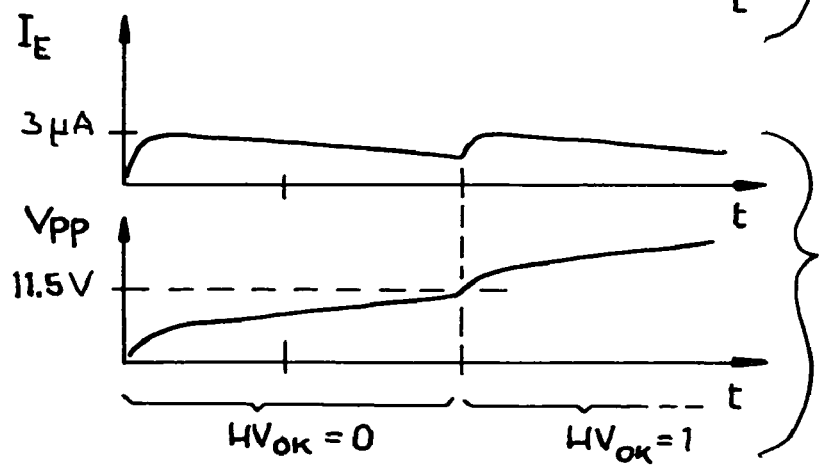

FIG. 3D shows the effect of short-circuiting or bridging the resistor R2 by switching-on the PMOS-transistor 2.1. Such switching takes place as soon as the function voltage $V_{PP}$ has reached, for example a value of 11.5 V, which results in a high level signal HV_OK=1. As a result, the transistor 2.1 is switched-on to short-circuit the resistor R2. Hence, the filter function of the current limiter 2 or rather of the RC-component is reduced which in turn leads to an improved efficiency. FIG. 3D illustrates this by the jump of the current and of the voltage when the signal HV_OK is at its high level "1".

According to the invention the current limiter 2 of FIG. 2 limits the operating voltage $V_{DD}$ to an operating voltage $V_{DD}'$ for the voltage converter 3. Such voltage limiting, however, has the consequence that the run-up characteristic of the function voltage $V_{PP}$ is drastically changed as shown above with reference to FIGS. 3A to 3D. Thus, according to the invention the run-up time of the function voltage $V_{PP}$ is a function of the field strength of the electromagnetic (RF) field that serves for the energy transmission. Alternatively, the run-up characteristic of the function voltage $V_{PP}$ may depend on the characteristics of another current or power supply source to which the input of the circuit arrangement 1 is connected. Such other power supply source characteristics may, for example be the internal impedance or the no load voltage or the like, for example, of a battery. The circuit arrangement 1 according to the invention takes this into account with the circuit 4 shown in FIGS. 1, 5 and 6.

FIG. 4 shows the details of the structural features of the voltage converter 3 according to the invention for producing the function voltage $V_{PP}$ from the operating voltage $V_{DD}$ or from the output voltage $V_{DD}'$ of the current limiter 2. The voltage converter 3 comprises a logic control circuit 3.1 shown on the left hand side of FIG. 4. The logic control circuit 3.1 comprises two NAND-gates 3.1a and 3.1b as well as four inverters 3.1c, 3.1d, 3.1e, and 3.1f. An input of the first NAND-gate 3.1a is directly connected with an input 3.2 of the voltage converter 3. An oscillator signal OSC_PROG is supplied to the input 3.2. The other input of the first NAND-gate 3.1a is connected through the inverter 3.1d with a second input 3.3 of the voltage converter 3. A control signal NHVON is supplied to the input 3.3. The high level of the control signal (NHVON=1) indicates that a sufficient function voltage has not been generated. The circuit connections of the second NAND-gate 3.1b correspond substantially to those of the first NAND-gate 3.1a. However, with regard to the second NAND-gate 3.1b an inverter 3.1c is also provided between the input for the oscillator signal OSC_PROG and the respective input of the NAND-gate 3.1b. An additional inverter 3.1e and 3.1f is connected to the respective outputs of the NAND-gates 3.1a and 3.1b.

The logic control circuit 3.1 described above provides two complementary clock signals CP1 and CP2 at the circuit nodes A and B for the voltage converter or voltage multiplier 3. According to the invention the voltage converter or multiplier 3 is constructed as a multistage charge pump. These clock signals CP1 and CP2 are dependent on the control signals OSC_PROG at the input 3.2 and NHVON at the input 3.3, respectively. The multistage charge pump according to the invention comprises the circuit components shown in the right-hand portion of FIG. 4. A switch is provided by a PMOS-transistor 3.4 having a gate 3.4a connected with the input 3.3 to receive the control signal NHVON. The source terminal 3.4b of the PMOS-transistor 3.4 is connected to the output voltage $V_{DD}'$ of the current limiter 2. Switches in the form of Schottky diodes 3.5, 3.5', 3.5" to 3.5(n) are connected to the drain terminal 3.4c of the PMOS-transistor switch 3.4. The number "n" of Schottky diodes depends on a factor indicating the desired voltage increase which is shown in FIG. 4 in parenthesis, thus: 3.5(n). The Schottky diodes 3.5 to 3.5(n) are connected in the same sense, namely in the conducting direction relative to the voltage $V_{DD}'$. The distal end of the diode series is connected to the output 3.6 at which the generated function voltage $V_{PP}$ is provided for use in the circuit 4. Thus, the output 3.6 of the voltage converter 3 is connected to the input 4.1 of the circuit 4 shown in FIG. 5.

Referring further to FIG. 4, the circuit node 3.7 between the Schottky diodes 3.5 and 3.5' is connected through a capacitor 3.9 to the conductor 3.8' of the clock signal CP2. Similarly, the circuit node 3.7' between the Schottky diode 3.5' and 3.5" is connected through a capacitor 3.9' to the conductor 3.8 of the first clock signal CP1. The node 3.7(n−2) between the Schottky diodes 3.5" and 3.5(n−1) is connected through a capacitor 3.9(n−2) to the conductor 3.8' supplying the clock signal CP2. Further, the node 3.7(n−1) between the diodes 3.5(n−1) and 3.5(n) is connected through a capacitor 3.9(n−1) to the conductor 3.8 supplying the first clock signal CP1.

The just described arrangement of Schottky diodes 3.5 to 3.5(n) and capacitors 3.9 to 3.9(n−1) functions as a multistage charge pump when a low level of the control signal NHVON is present at the input 3.3. The charge pump successively increases the potential at the circuit nodes 3.7 to 3.7(n−1) in a so-called HV-cascade to thereby provide at the output 3.6 the function voltage $V_{PP}$. This function voltage $V_{PP}$ is several times larger than the input voltage $V_{DD}'$. The function voltage $V_{PP}$ is useable according to the invention for performing a function sequence. By using Schottky diodes 3.5 to 3.5(n) according to the invention in the charge pump, instead of conventional transistor switches, the invention reduces the dissipation power due to the smaller voltage drops encountered with Schottky diodes as compared to transistor switches. Thus, fewer charge pump stages can achieve higher function voltages as compared to conventional transistor switched charge pumps.

Figure 5:
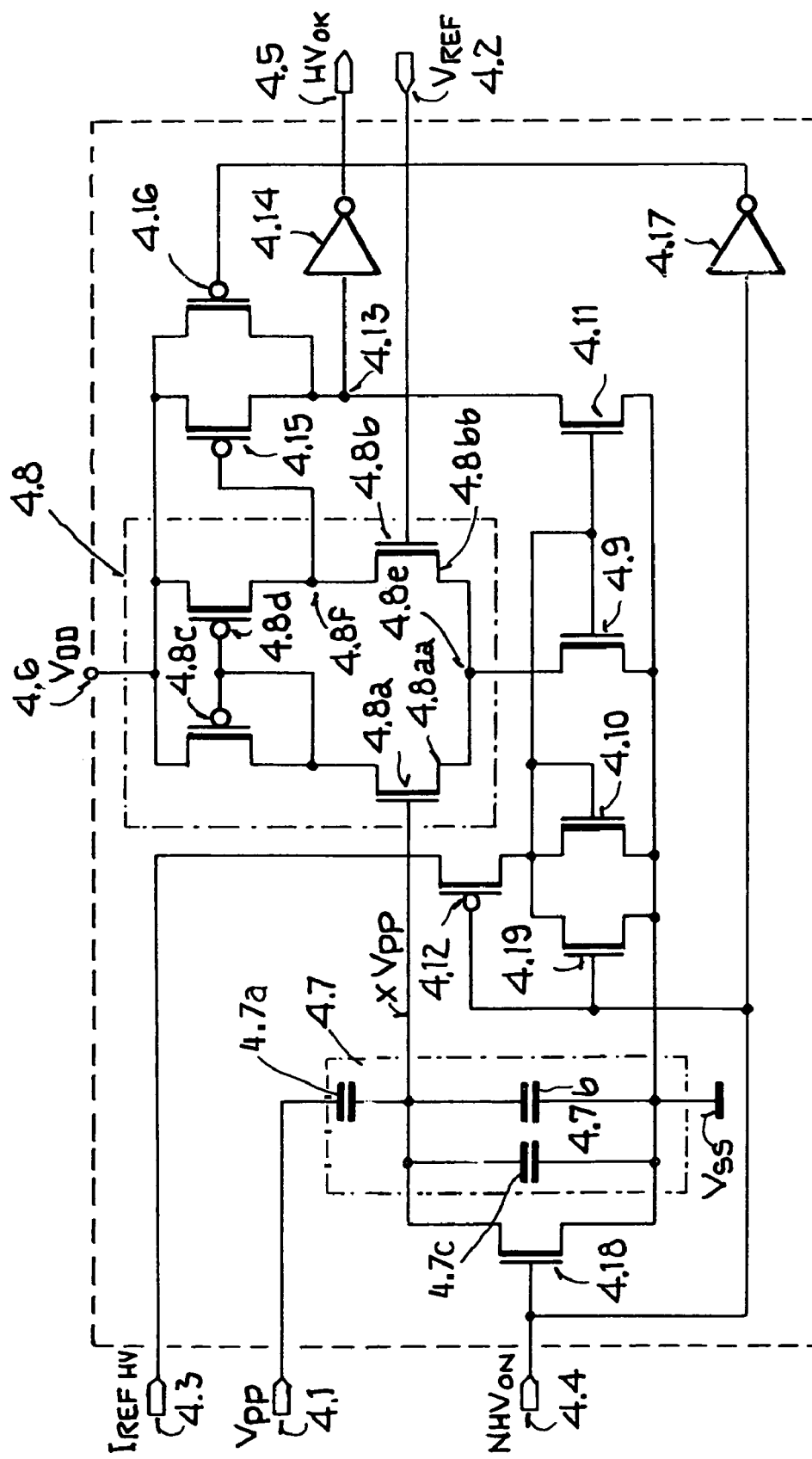
FIG. 5 shows a detailed circuit diagram of the present voltage processing circuit including the determining circuit section and the valuation circuit section.

FIG. 5 shows the details of the combined determination and valuation circuit 4 comprising a determination circuit section 4.7 realized, for example as a capacitive voltage divider, and a valuation circuit section 4.8 functioning as a comparator or differential amplifier. The circuit 4 comprises inputs 4.1 for the function voltage $V_{PP}$, 4.2 for the reference voltage $V_{REF}$, 4.3 for the reference current $I_{REFHV}$ and 4.4 for the control signal NHVON. The circuit 4 has a further input 4.6 for the operating voltage $V_{DD}$. An output 4.5 is provided for the output signal HV_OK produced by the circuit 4.

The determination circuit section 4.7 according to the invention is a capacitive voltage divider comprising two capacitors 4.7A and 4.7B connected in series with each other. One end of the voltage divider is connected to the function voltage $V_{PP}$ at the input 4.1. The other end of the voltage divider is connected to a substrate potential $V_{SS}$. The capacitor 4.7B of the voltage divider is also connected in parallel with a third capacitor 4.7C that may be switched off for tuning the voltage divider 4.7 to a obtain a different divider ratio. The capacitive voltage divider prevents a flow of a d.c. current, whereby the load on the output 3.6 of the voltage converter of FIG. 4 is substantially zero.

The valuating circuit section 4.8 of the circuit 4 shown in FIG. 5 is constructed as a comparator that functions as a differential amplifier comprising two NMOS-transistors 4.8a and 4.8b as well as a PMOS-current mirror comprising two PMOS-transistors 4.8c and 4.8d. The valuating circuit section 4.8 functioning as a differential amplifier is connected with its input terminal 4.6 formed by the PMOS-current mirrors 4.8c and 4.8d, to the operating voltage $V_{DD}$. Another terminal 4.8e is connected through an NMOS-transistor 4.9 to the substrate potential $V_{SS}$. The terminal 4.8e is also connected to the source terminals 4.8aa and 4.8bb of the two NMOS-transistors 4.8a and 4.8b.

The NMOS-transistor 4.9 and a further NMOS-transistor 4.10 are interconnected to form a current mirror thereby operating together as a constant current circuit for the valuating circuit section 4.8 functioning as a differential amplifier. A further NMOS-transistor 4.11 cooperates with a PMOS-transistor 4.12 which is connected to the reference current signal IREF_HV at the input 4.3. Additionally, the gate terminal of the NMOS transistor 4.12 is connected to the input terminal 4.4 to receive the control signal NHVON. An inverter 4.14 is connected between a circuit node 4.13 and the output 4.5 which provides the control signal HV_OK.

Two PMOS-transistors 4.15 and 4.16 are connected between the terminal 4.6 providing the operating voltage $V_{DD}$, and the circuit node 4.13 to control the potential or signal at the circuit node 4.13. The gate terminal of the PMOS-transistor 4.15 is connected to a circuit node 4.8f of the valuating circuit 4.8. The gate terminal of the PMOS-transistor 4.16 is connected through an inverter 4.17 to the input terminal 4.4 providing the signal NHVON.

When the control signal NHVON at the input terminal 4.4 is zero (NHVON=0), the determination circuit section 4.7 more specifically the voltage divider provides an output voltage $xV_{PP}$ which is derived from the function voltage $V_{PP}$ and hence directly proportional to $V_{PP}$. The output voltage $xV_{PP}$ is applied to the gate of the first NMOS-transistor 4.8a of the valuating circuit section 4.8 functioning as a comparator and differential amplifier. The reference voltage $V_{REF}$ is applied to the gate of the second NMOS-transistor 4.8b of the circuit section 4.8 which thus compares $xV_{PP}$ with $V_{REF}$. Provided that $xV_{PP}$ is larger than or equal to $V_{REF}$ ($xV_{PP} \geq V_{REF}$) and provided that NHVON is equal to zero (NHVON=0), an output voltage will be provided at the node 4.8f as a result of the comparing. This output voltage is a signal that blocks the PMOS-transistor 4.15 whereby the circuit node 4.13 is at the substrate potential, that is at the low level. Thus, due to the inverter 4.14, an output signal HV_OK at the output 4.5 will be at the high level (HV_OK=1) which is an indication that the function voltage $V_{PP}$ is adequate for performing a function sequence.

When the control signal NHVON=0 and the divider voltage $xV_{PP}<V_{REF}$ the circuit node 4.13 is at the high level and the HV_OK is at the low level (HV_OK=0). As long as the control signal NHVON=1, the divider voltage $xV_{PP}$ is 0V, whereby the PMOS-transistor 4.16 is switched to its conducting state. As a result, the node 4.13 is at the operating voltage $V_{DD}$ as long as the conditions (NHVON=1 and $xV_{PP}$=0) prevail. The operating voltage $V_{DD}$ represents a high level whereby the output 4.5 provides the signal HV_OK=0 due to the inverter 4.14. HV_OK=0 indicates that a function sequence cannot be performed. Simultaneously further switching components of the circuit 4 including NMOS-transistors 4.18 and 4.19 make certain that for NHVON=1 correspondingly defined states are present at the circuit node 4.13, namely the high level "1".

Figure 6:
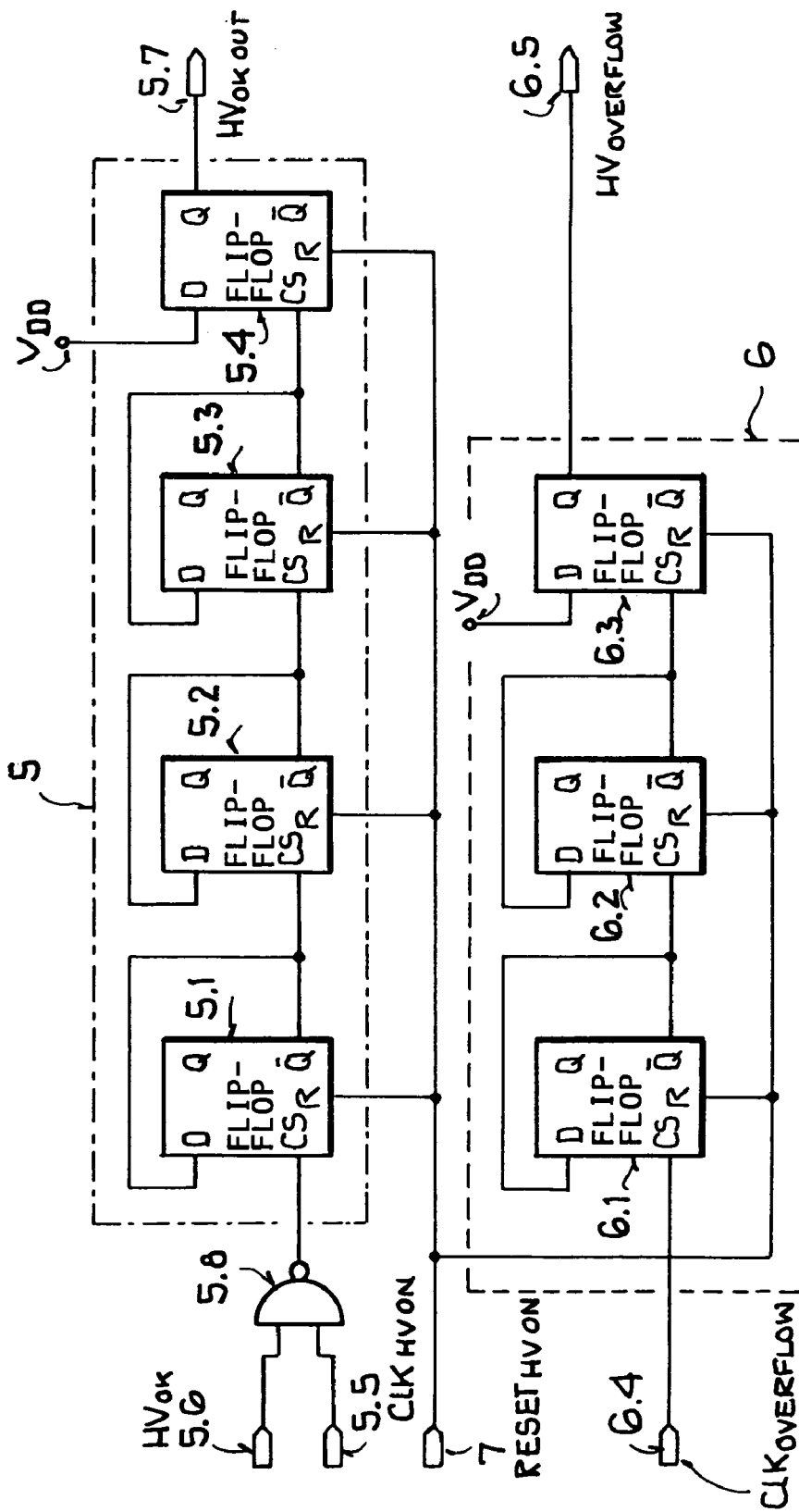
FIG. 6 is a detailed circuit diagram of first and second time counters as used in the circuit arrangement of the invention shown in FIG. 1.

FIG. 6 illustrates suitable counters 5 and 6 which are preferably incorporated in or integrated into the circuit 4 according to the invention. These counters 5 and 6 receive or sample signals for evaluation from the output signal HV_OK at the output 4.5 of FIG. 5 which is connected to the input 5.6 to supply the signal HV_OK through an AND-gate 5.8 to the input of the counter 5. Another input 5.5 of the AND-gate 5.8 is connected to receive a clock signal CLKHVON for the counter 5 which is referred to as the first counter. This signal application is necessary according to the invention in order to control in a closed loop fashion and thus adapt the duration needed for performing a function sequence such as a programming duration as a function of the run-up time of the function voltage $V_{PP}$.

FIG. 6 shows the first counter 5 in the form of a so-called "Gut" sample counter and the second counter 6 as a sample counter. These counters 5 and 6 each comprise a plurality of stages connected in a series chain and function as a frequency divider. The series chain 5 of the first counter is formed by D-flip-flops 5.1, 5.2, 5.3 and 5.4. Thus, the first counter has four stages. The second counter 6 comprises three stages of D-flip-flops 6.1, 6.2 and 6.3. Each of these flip-flops can be triggered by a single flank trigger signal. The first stage 6.1 is connected to a clock input 6.4 for inputting a clock overflow signal CLK_OVERFLOW. A reset input 7 is provided in common for both counters 5 and 6 to input the signal HVON as a reset signal RESET_HVON. Another input 5.5 of the AND-gate 5.8 receives the signal HVON as a clock signal CLK_HVON. As mentioned, the signal to be evaluated, namely the signal HV_OK is supplied to the first input 5.6 of the AND-gate 5.8. The "Gut" sample counter 5 has an output 5.7 while the sample counter 6 has an output 6.5. The AND-gate 5.8 links the signals at the inputs 5.5 and 5.6 to provide an output signal of the AND-gate 5.8 as a clock signal to the input CS of the first flip-flop 5.1. The data input D of the last flip-flop 5.4 and of the last flip-flop 6.3 are connected to the operating voltage $V_{DD}$.

Each of the flip-flops 5.1 to 5.4 of the first counter 5 and flip-flops 6.1 to 6.3 of the second counter 6 functions as a "1:2" frequency divider so that the shown chain circuits of these flip-flop stages are useable as so-called dual counters. When and if a high level signal (HV_OK=1) appears at the input 5.6 of the counter 5, the latter steps up by one step in response to each rising flank of the clock signal CLK_H-V_OK at the input 5.5. This step up is continued until the output signal HV_OK_OUT=1 appears at the output 5.7 of the flip-flop 5.4 and when the clock signal has a rising flank at the input CS of the last flip-flop 5.4. Such a count indicates a sufficient number of positive function voltage samples so that the performance of a respective function sequence can be valuated as successfully concluded. Such function sequence may, for example be a programming operation or an erasing operation. This feature of the invention distinguishes the invention from conventional open loop control solutions in which always a determined fixed and given time duration must pass prior to switching off the function voltage at which time a function sequence can be qualified as a successfully concluded performance of a function sequence. The maximally countable "Gut" sample number $n_{max}$ is determined by the number of the flip-flops used in the chain.

The second sample counter 6 functions in analogy to the function of the first counter 5. However, in the second sample counter only the overflow signals of CK OVERFLOW are counted. More specifically, a certain time duration is ascertained which is preferably beginning at the time when the function voltage generation begins. When the counter 6 reaches its end value which is also determined by the number of flip-flops used in the chain of the second counter 6, a signal HV OVERFLOW is outputted at the output 6.5. This overflow signal indicates that a maximally permissible time for the function voltage generation has been exceeded. As a result, the output signal of the sample counter 6 dominates or "out votes" the output signal of the "Gut" sample counter 5. More specifically, the function sequence currently in progress is terminated or it is qualified as "failed" when HV_OVERFLOW=1 is set prior to HV_OK_OUT=1. This operation takes place preferably in a suitably constructed function control circuit not shown. Under this condition the actual time end value of the counter 6 is higher than that of the counter 5. Such larger duration of the time end value of the counter 6 can be achieved, for example, by a correspondingly longer clock period of the signal CK OVERFLOW at the input 6.4 of the second counter 6.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A circuit arrangement for increasing a functional transmission range of a passive device having an input to receive an operating voltage (Vdd) from a source, said circuit arrangement comprising a voltage converter (3) connected to said input for generating from said operating voltage a function voltage (Vpp) for performing at least one function sequence in said passive device, a voltage processing circuit (4) including a voltage determination circuit (4.7) connected at (3.6) to said voltage converter (3) for determining at least one characteristic of said function voltage (Vpp), said voltage processing circuit (4) further comprising a valuation circuit (4.8) having an input connected to an output of said voltage determination circuit for generating a logic control signal (HVok) based on said at least one characteristic, said circuit arrangement further comprising a first time counter (5) having an input connected to receive said logic control signal (HVok) for limiting a time duration of a performance of said at least one function sequence to a duration actually required for the performance of said at least one function sequence, said valuation circuit further comprising a second time counter connected for confirming or rejecting a function performance controlled by said first time counter.

2. The circuit arrangement of claim 1, wherein said valuation circuit (4.8) comprises a comparator and a source of a reference value ($V_{REF}$) connected to one input of said comparator, said comparator having a further input connected to said determination circuit (4.7) for receiving said at least one characteristic of said function voltage ($V_{PP}$).

3. The circuit arrangement of claim 1, wherein said determination circuit (4.7) comprises means for generating said at least one characteristic as a voltage representing said function voltage ($V_{PP}$).

4. The circuit arrangenient of claim 3, wherein said means for generating comprise a voltage divider for generating a voltage that is said at least one characteristic.

5. The circuit arrangement of claim 4, wherein said voltage divider comprises capacitors for generating said voltage that is said at least one characteristic.

6. The circuit arrangement of claim 1, wherein said first time counter (5) comprises means for counting a first number of time intervals during which said function voltage ($V_{PP}$) is capable of performing a function sequence.

7. The circuit arrangement of claim 1, wherein said second time counter (6) comprises means for counting a second number of time intervals that have passed since said generating of said function voltage ($V_{PP}$).

8. The circuit arrangement of claim 7, further comprising means for monitoring said second number of time intervals counted by said second time counter (6), and means for terminating and/or rejecting any function sequence in response to said second number of time intervals counted by said second time counter (6) exceeding a predetermined count.

9. The circuit arrangement of claim 6, further comprising means for monitoring said first number of time intervals counted by said first time counter (5), and means for acknowledging a result of a performed function sequence in response to said first number of time intervals counted by said first time counter reaching a predetermined count.

10. The circuit arrangement of claim 1, further comprising a current limiter (2) operatively connected between said operating voltage input and said voltage converter (3) for limiting a switch-on current.

11. The circuit arrangement of claim 10, wherein said current limiter (2) comprises a MOSFET-transistor and a closed control loop connected to supply said logic control signal (HVok) to said MOSFET-transistor.

12. The circuit arrangement of claim 10, wherein said current limiter (2) comprises at least one resistor and capacitor RC-component ($R_1$, $R_2$, $C_1$).

13. The circuit arrangement of claim 12, further comprising switching means for switching said RC-component to change an RC-component characteristic.

14. The circuit arrangement of, claim 1, wherein said voltage processing circuit (4) comprises Schottky-diodes functioning as switches for limiting a dissipation power.

15. The circuit arrangement of claim 1, used in said passive device including any one of a transponder and a remote sensor adapted for responding to an interrogation signal supplied through an electromagnetic field.

16. A method for increasing a transmission range of a passive device which receives its operating voltage from a source, said method comprising the following steps:
   a) generating a function voltage out of said operating voltage, said function voltage being sufficient for enabling said passive device to perform at least one function sequence;
   b) generating at least one characteristic of said function voltage to provide a logic control signal (HVok) in response to said at least one characteristic,
   c) counting in response to said logic control signal (HVok) a first number of time intervals for limiting a performance duration of said at least one function sequence to a time actually required for the performance of said at least one function sequence and
   d) counting a second number of time intervals that have passed since generating said function voltage and confirming or rejecting said at least one function sequence if said second time intervals exceed a predetermined count.

17. The method of claim 16, wherein, said at least one characteristic is a characteristic voltage representing said function voltage, and further comprising comparing said characteristic voltage with a reference voltage value.

18. The method of claim 16, further comprising determining, based on said counted first number of time intervals, whether said function voltage has a characteristic required for performing said respective function sequence.

19. The method of claim 18, further comprising acknowledging a function sequence result in response to said first number of time intervals reaching a predetermined count.

20. The method of claim 16, further comprising limiting as a function of time, an input current derived from said source prior to said step of generating said function voltage.

21. The method of claim 20, further comprising performing said current limiting with a closed loop control.

22. The method of claim 16, further comprising performing said at least one function sequence as a programming operation when said function voltage is adequate for said programming operation.

* * * * *

UNITED STATES PATENT AND TRADEMARK OFFICE
CERTIFICATE OF CORRECTION

| | |
|---|---|
| PATENT NO. | : 7,436,286 B2 |
| APPLICATION NO. | : 11/002852 |
| DATED | : October 14, 2008 |
| INVENTOR(S) | : Fischer et al. |

It is certified that error appears in the above-identified patent and that said Letters Patent is hereby corrected as shown below:

On the Title page,

Item [*] Notice: Subject to any disclaimer, the term of this patent is extended or adjusted under 35 USC 154(b) by (326) days
Delete the phrase "by 326 days" and insert --by 254 days--

On the Title page,
Item [56], References Cited,
U.S. PATENT DOCUMENTS
above Line 1, insert --3,961,287 * 06/1976 Cacciola et al.--;
FOREIGN PATENT DOCUMENTS
Line 1, replace "35 55 202" by --38 55 202--;

Column 6,
Line 14, after "or", replace "standby" by --stand-by--;
Line 52, after "current", replace "IE" by --$I_E$--;

Column 10,
Line 28, after "$V_{REF}$", insert --,--;

Column 12,
Line 31, after "circuit", replace "arrangenient" by --arrangement--;

Column 13,
Line 4, after "of", delete ",";

UNITED STATES PATENT AND TRADEMARK OFFICE
CERTIFICATE OF CORRECTION

PATENT NO. : 7,436,286 B2
APPLICATION NO. : 11/002852
DATED : October 14, 2008
INVENTOR(S) : Fischer et al.

It is certified that error appears in the above-identified patent and that said Letters Patent is hereby corrected as shown below:

Column 14,
Line 6, after "wherein", delete ",".

Signed and Sealed this

Thirteenth Day of October, 2009

David J. Kappos
*Director of the United States Patent and Trademark Office*